United States Patent
Ashizawa et al.

(10) Patent No.: US 7,487,756 B2
(45) Date of Patent: Feb. 10, 2009

(54) DIRECT FUEL INJECTION-TYPE SPARK IGNITION INTERNAL COMBUSTION ENGINE

(75) Inventors: Takeshi Ashizawa, Yokohama (JP); Osamu Tomino, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 28 days.

(21) Appl. No.: 11/794,901

(22) PCT Filed: Nov. 14, 2006

(86) PCT No.: PCT/JP2006/323053

§ 371 (c)(1), (2), (4) Date: Jul. 9, 2007

(87) PCT Pub. No.: WO2007/063728

PCT Pub. Date: Jun. 7, 2007

(65) Prior Publication Data

US 2008/0110438 A1 May 15, 2008

(30) Foreign Application Priority Data

Nov. 30, 2005 (JP) ............................. 2005-345641

(51) Int. Cl.
*F02B 17/00* (2006.01)
(52) U.S. Cl. .................. 123/295; 123/299; 701/105
(58) Field of Classification Search .............. 123/295, 123/299; 701/105
See application file for complete search history.

(56) References Cited

U.S. PATENT DOCUMENTS 6,067,954 A * 5/2000 Kudou et al. ............... 123/299
6,116,208 A * 9/2000 Nishimura et al. .......... 123/295
6,510,834 B1  1/2003 Tomita et al.
6,976,468 B2 * 12/2005 Nakayama et al. .......... 123/295
7,051,701 B2 * 5/2006 Tomita ....................... 123/299
7,347,181 B2 * 3/2008 Yamashita et al. .......... 123/295

(Continued)

FOREIGN PATENT DOCUMENTS

EP 1 223 329 A2 7/2002

(Continued)

*Primary Examiner*—Erick Solis
(74) *Attorney, Agent, or Firm*—Oliff & Berridge, PLC

(57) ABSTRACT

A direct cylinder fuel injection-type spark ignition internal combustion engine which executes a stratified charge combustion by vaporizing the fuel while flying after having been injected into the cylinder in the compression stroke to form a mixture in a portion in the cylinder, and by igniting and burning the mixture by positioning the spark gap of a spark plug in the mixture at the ignition timing before the compression top dead center, wherein when the fuel is required in an increased amount and the air-fuel ratio of the mixture formed by the fuel injected by the first fuel injection near the ignition timing becomes too rich, part of the required amount of fuel is injected by a second fuel injection in the compression stroke separately from the first fuel injection and when the amount of fuel injected by the second fuel injection becomes larger than a preset amount, the second fuel injection is brought to the side in advance of the first fuel injection and when the amount of fuel injected by the second fuel injection becomes smaller than the preset amount, the second fuel injection is brought to the side delayed behind the first fuel injection.

5 Claims, 3 Drawing Sheets

U.S. PATENT DOCUMENTS

2002/0134346 A1 9/2002 Yamauchi et al.
2003/0192504 A1* 10/2003 Nakayama et al. .......... 123/295
2003/0230276 A1* 12/2003 Kataoka et al. ............. 123/295

FOREIGN PATENT DOCUMENTS

| JP | A-2000-274284 | 10/2000 |
|----|---------------|---------|
| JP | A-2001-082211 | 3/2001  |
| JP | A-2001-098971 | 4/2001  |
| JP | A-2002-201990 | 7/2002  |
| JP | A-2002-349335 | 12/2002 |
| JP | A-2003-049679 | 2/2003  |
| JP | A-2005-256791 | 9/2005  |

* cited by examiner

DIRECT FUEL INJECTION-TYPE SPARK IGNITION INTERNAL COMBUSTION ENGINE

TECHNICAL FIELD

The present invention relates to a direct fuel injection-type spark ignition internal combustion engine.

BACKGROUND ART

There has been known a stratified charge combustion enabling the combustion to take place by setting the air-fuel ratio in the whole cylinder to be leaner than the stoichiometric air-fuel ratio by vaporizing the fuel while it is flying after having been injected into the cylinder in the compression stroke to form a mixture in a portion of the cylinder, and by igniting the mixture using a spark plug to burn it. In the stratified charge combustion, a fuel injection valve injects the fuel in a manner that at least part of the fuel passes through the spark gap of the spark plug, the timing for ending the fuel injection is set to be close to the ignition timing, and the spark gap of the spark plug is positioned in the mixture at the ignition timing so that the mixture is ignited to burn.

In the stratified charge combustion, when fuel is required in a relatively small amount, the air-fuel ratio of the mixture that is formed becomes close to the stoichiometric air-fuel ratio i.e., a favorable stratified charge combustion can be realized. However, when fuel is required in an increased amount accompanying an increase in the engine load, the air-fuel ratio of the mixture that is formed becomes too rich making it difficult to realize a favorable stratified charge combustion and, besides, giving rise to a misfire.

To prevent this problem, there has been proposed a direct fuel injection-type spark ignition internal combustion engine according to which when the fuel is required in an increased amount, part of the fuel is injected in advance into the cylinder in the compression stroke to prevent the air-fuel ratio of the mixture from becoming too rich, the mixture being formed by the injection of fuel with its timing for ending the fuel injection set to be close to the ignition timing (see, for example, JP-A-2003-49679 and JP-A-2002-201990).

In the above direct fuel injection-type spark ignition internal combustion engine, if the amount of fuel injected by the first fuel injection near the ignition timing is suitably selected, then the mixture formed by the injection of fuel can be reliably ignited and burned. However, in case where the required amount of fuel is slightly larger than the amount of fuel injection suited for the first fuel injection and the amount of fuel injected by the second fuel injection before the first fuel injection is smaller than the amount of fuel injected by the first fuel injection, the pressure in the cylinder at the time of the second fuel injection is definitely lower than the pressure in the cylinder at the time of the first fuel injection. Therefore, the fuel injected by the second fuel injection is small in amount and is, further, subject to be dispersed. Therefore, the air-fuel ratio of the mixture formed by the injection of fuel becomes too lean.

It is difficult to ignite and burn the above too lean mixture even if it is caught by the burning mixture that is formed by the fuel injected by the first fuel injection. In the above case, therefore, it is difficult to realize the favorable stratified charge combustion. Much of the fuel injected by the second fuel injection is emitted as unburned fuel from the cylinder deteriorating the quality of emission and making it difficult to burn the required amount of fuel and, therefore, making it difficult to obtain a required engine output.

It is therefore an object of the present invention to provide a direct fuel injection-type spark ignition internal combustion engine which executes the stratified charge combustion by vaporizing the fuel injected into the cylinder while it is flying to form a mixture in a portion in the cylinder, and by igniting the mixture by using a spark plug to burn it, wherein a favorable stratified charge combustion is realized even when the fuel is required in a relatively increased amount.

DISCLOSURE OF THE INVENTION

A direct fuel injection-type spark ignition internal combustion engine of the present invention described in claim 1 executes a stratified charge combustion by vaporizing the fuel while flying after having been injected into the cylinder in the compression stroke to form a mixture in a portion in the cylinder, and by igniting and burning the mixture by positioning the spark gap of a spark plug in the mixture at the ignition timing before the compression top dead center, wherein when the fuel is required in an increased amount and the air-fuel ratio of the mixture formed by the fuel injected by the first fuel injection near the ignition timing becomes too rich, part of the required amount of fuel is injected by a second fuel injection in the compression stroke separately from the first fuel injection and when the amount of fuel injected by the second fuel injection becomes larger than a preset amount, the second fuel injection is brought to the side in advance of the first fuel injection and when the amount of fuel injected by the second fuel injection becomes smaller than the preset amount, the second fuel injection is brought to the side delayed behind the first fuel injection.

The direct fuel injection-type spark ignition internal combustion engine of the invention described in claim 2 is concerned to the direct fuel injection-type spark ignition internal combustion engine described in claim 1, wherein when the second fuel injection is brought to the side in advance of the first fuel injection, the second fuel injection is brought to the further advanced side with an increase in the amount of fuel injected by the second fuel injection.

The direct fuel injection-type spark ignition internal combustion engine of the invention described in claim 3 is concerned to the direct fuel injection-type spark ignition internal combustion engine described in claim 1, wherein when the second fuel injection is brought to the side delayed behind the first fuel injection, the second fuel injection is brought to the further delayed side with a decrease in the amount of fuel injected by the second fuel injection.

The direct fuel injection-type spark ignition internal combustion engine of the invention described in claim 4 is concerned to the direct fuel injection-type spark ignition internal combustion engine described in claim 1, wherein at least part of the fuel injected by the first fuel injection and the second fuel injection passes through the spark gap of the spark plug, and the penetration force of the fuel injected by the first fuel injection is set to be weaker than the penetration force of the fuel injected by the second fuel injection.

A direct fuel injection-type spark ignition internal combustion engine of the present invention described in claim 5 executes a stratified charge combustion by vaporizing the fuel while it is flying after having been injected into the cylinder in the expansion stroke to form a mixture in a portion in the cylinder, and by igniting and burning the mixture by positioning the spark gap of a spark plug in the mixture at the ignition timing after the compression top dead center, wherein when the fuel is required in an increased amount and the air-fuel ratio of the mixture formed by the fuel injected by the first fuel injection near the ignition timing becomes too rich, part of the required amount of fuel is injected by a second fuel injection in the expansion stroke separately from the first fuel injection and when the amount of fuel injected by the second fuel injection becomes larger than a preset amount, the second fuel injection is brought to the side delayed behind the first fuel injection and when the amount of fuel injected by the second fuel injection becomes smaller than the preset amount, the second fuel injection is brought to the side in advance of the first fuel injection.

According to the direct fuel injection-type spark ignition internal combustion engine of the present invention described in claim 1, when the fuel is required in an increased amount and the air-fuel ratio of the mixture formed by the fuel injected by the first fuel injection near the ignition timing before the compression top dead center becomes too rich, part of the required amount of fuel is injected by the second fuel injection in the compression stroke separately from the first fuel injection. Therefore, the air-fuel ratio of the mixture formed by the fuel injected by the first fuel injection is brought close to the stoichiometric air-fuel ratio, and the mixture is reliably ignited at the ignition timing and is burned.

As a result, if the amount of fuel injected by the second fuel injection becomes larger than the preset amount, the second fuel injection is brought to the side in advance of the first fuel injection. Therefore, the pressure in the cylinder becomes relatively low at the time of the second fuel injection, whereby the injected fuel disperses well, and the air-fuel ratio of the mixture formed by the fuel injected in a relatively large amount by the second fuel injection can be brought close to the stoichiometric air-fuel ratio. Namely, the mixture can be reliably ignited and burned by being caught by the burning mixture that is formed by the fuel injected by the first fuel injection. Thus, a favorable stratified charge combustion is realized by burning nearly all of the required amount of fuel.

Further, if the amount of fuel injected by the secondary fuel injection becomes smaller than the preset amount, the second fuel injection is brought to the side delayed behind the first fuel injection. At the time of the second fuel injection, therefore, the pressure in the cylinder becomes relatively high, and the injected fuel disperses little making it possible to bring the air-fuel ratio of the mixture formed by the fuel of a relatively small amount injected by the second fuel injection close to the stoichiometric air-fuel ratio. The mixture catches the burning mixture that is formed by the fuel injected by the first fuel injection, and is reliably ignited and burns. Thus, a favorable stratified charge combustion is realized by burning nearly all of the required amount of fuel.

According to the direct fuel injection-type spark ignition internal combustion engine of the invention described in claim 2 which is concerned to the direct fuel injection-type spark ignition internal combustion engine described in claim 1, when the second fuel injection is brought to the side in advance of the first fuel injection, it is desired to further disperse the injected fuel to bring the air-fuel ratio of the formed mixture close to the stoichiometric air-fuel ratio with an increase in the amount of fuel injected by the second fuel injection. Therefore, the second fuel injection is brought to the further advanced side and the pressure in the cylinder is further decreased at the time of the secondary fuel injection.

According to the direct fuel injection-type spark ignition internal combustion engine of the invention described in claim 3 which is concerned to the direct fuel injection-type spark ignition internal combustion engine described in claim 1, when the second fuel injection is brought to the side delayed behind the first fuel injection, it is desired to little disperse the injected fuel to bring the air-fuel ratio of the formed mixture close to the stoichiometric air-fuel ratio with a decrease in the amount of fuel injected by the second fuel injection. Therefore, the second fuel injection is brought to the further delayed side and the pressure in the cylinder is further increased at the time of the secondary fuel injection.

According to the direct fuel injection-type spark ignition internal combustion engine of the invention described in claim 4 which is concerned to the direct fuel injection-type spark ignition internal combustion engine described in claim 1, the penetration force of the fuel injected by the first fuel injection is set to be weaker than the penetration force of the fuel injected by the second fuel injection. Therefore, the fuel injected by the first fuel injection at the ignition timing and is passing through the spark gap of the spark plug is little likely to blow out the spark generating across the spark gap.

According to the direct fuel injection-type spark ignition internal combustion engine of the present invention described in claim 5, when the fuel is required in an increased amount and the air-fuel ratio of the mixture formed by the fuel injected by the first fuel injection near the ignition timing becomes too rich like in the case of elevating the temperature of the exhaust gas by setting the ignition timing to be after the compression top dead center in order to warm up the catalyst device arranged in the engine exhaust system, part of the required amount of fuel is injected by the second fuel injection in the expansion stroke separately from the first fuel injection. If the amount of fuel injected by the second fuel injection becomes larger than the preset amount, the second fuel injection is brought to the delay side where the pressure in the cylinder is relatively low. If the amount of fuel injected by the second fuel injection becomes smaller than the preset amount, the second fuel injection is brought to the advancing side where the pressure in the cylinder is relatively high. Like in the direct fuel injection-type spark ignition internal combustion engine described in claim 1, therefore, the mixture formed by the fuel injected by the first fuel injection as well as the mixture formed by the fuel injected by the second fuel injection can be brought close to the stoichiometric air-fuel ratio, and a favorable stratified charge combustion is realized by burning nearly all of the required amount of fuel in the expansion stroke.

BEST MODE FOR CARRYING OUT THE INVENTION

Figure 1:
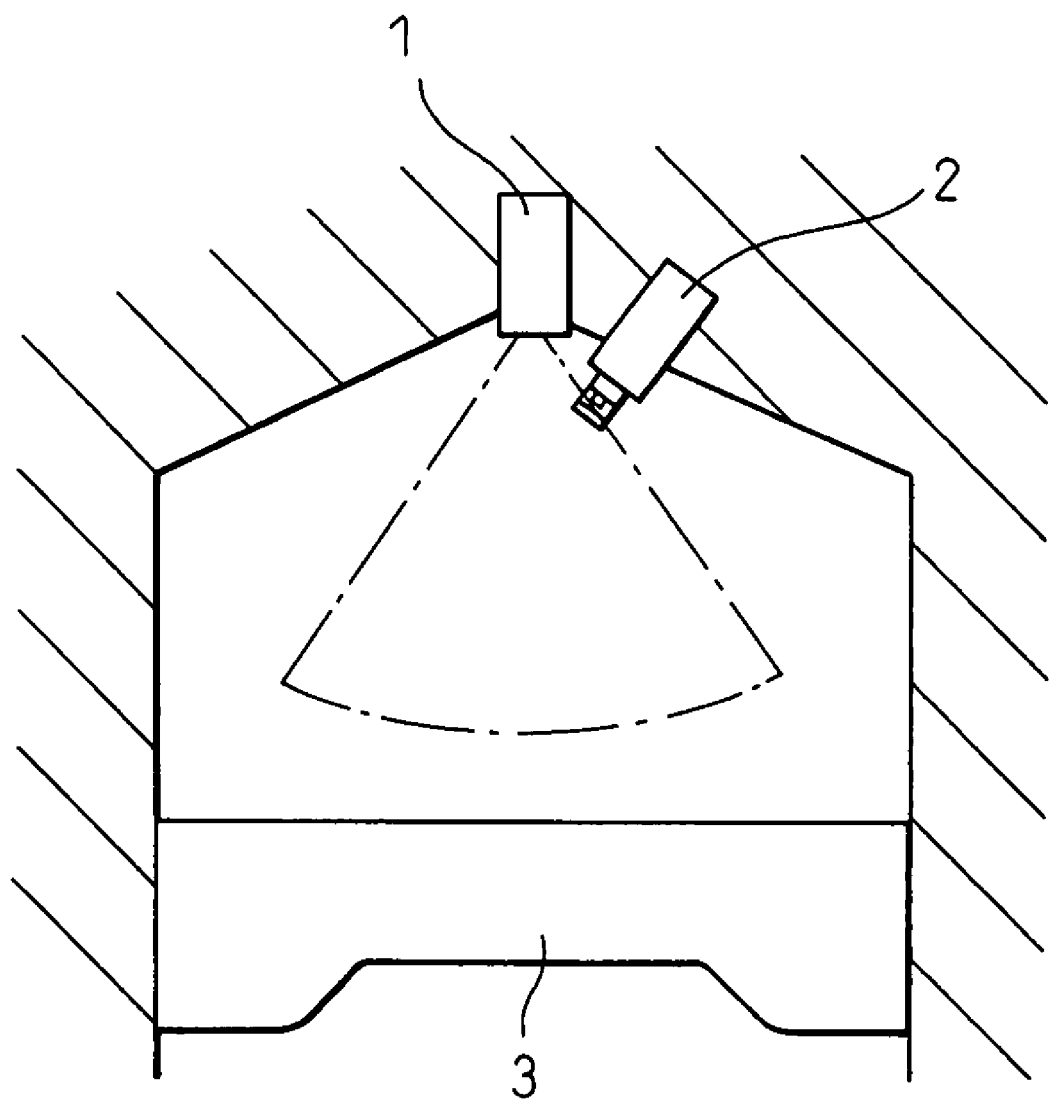
FIG. 1 is a vertical sectional view schematically illustrating an embodiment of a direct fuel injection-type spark ignition internal combustion engine according to the present invention.

FIG. 1 is a vertical sectional view schematically illustrating an embodiment of a direct fuel injection-type spark ignition internal combustion engine according to the present invention. In FIG. 1, reference numeral 1 denotes a fuel injection valve arranged nearly at the center in the upper part of the cylinder and injects the fuel directly into the cylinder, and 2 is a spark plug arranged near the fuel injection valve 1. The spark plug 2 is arranged, for example, between the two exhaust valves. Reference numeral 3 denotes a piston.

The fuel injection valve 1 injects the fuel toward the top surface of the piston in, for example, a hollow conical shape. The thus injected fuel spray of the hollow conical shape vaporizes due to friction with the air taken into the cylinder and forms a mixture in a portion in the cylinder. Part of the fuel spray passes through the spark gap of the spark plug 2. Therefore, if the timing for ending the fuel injection is near the ignition timing, the spark gap can be positioned in the mixture at the ignition timing to ignite and burn the mixture. The mixture formed in only a portion in the cylinder is thus ignited and burned to realize the stratified charge combustion which is leaner than the stoichiometric air-fuel ratio in the whole cylinder.

Here, the air-fuel ratio of the mixture formed by the injected fuel with the timing for ending the fuel injection near the ignition timing, becomes close to the stoichiometric air-fuel ratio when the required amount of fuel determined by the engine load is relatively small; i.e., the mixture can be ignited and burned as described above. When the fuel is required in an increased amount accompanying an increase in the engine load, however, the fuel injection with the timing for ending the fuel injection near the ignition timing does not permit the injected fuel to be so much dispersed due to a relatively high pressure in the cylinder at the time of fuel injection. In the stratified charge combustion, further, the throttle valve is usually fully opened to decrease the pumping loss, and the amount of the air taken in the cylinder remains nearly constant. Therefore, the air-fuel ratio of the mixture that is formed becomes too rich making it difficult to realize a favorable stratified charge combustion.

Figure 2:
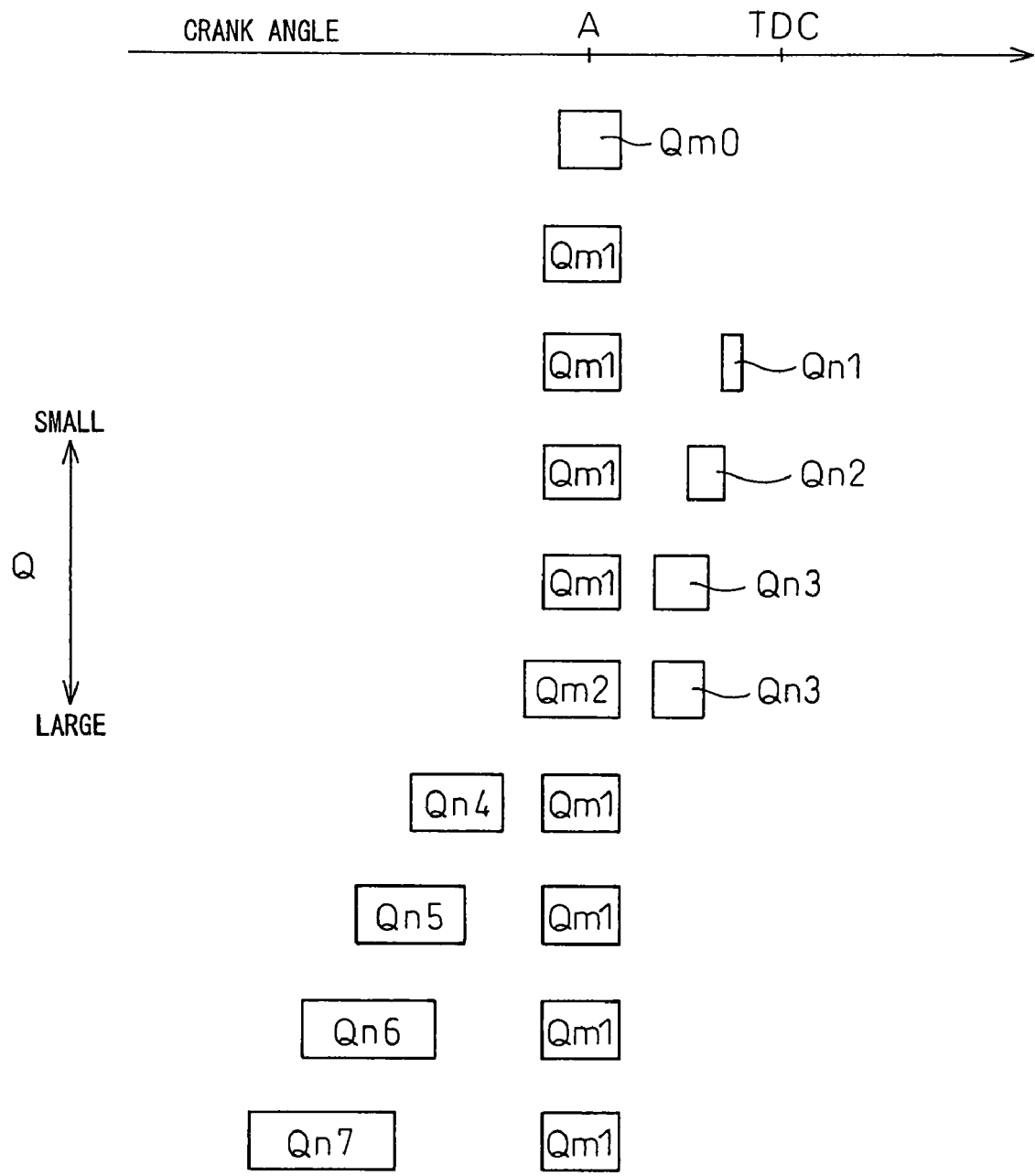
FIG. 2 is a diagram illustrating a relationship in the amount of fuel injection between the first fuel injection and the second fuel injection for the required amount of fuel in the stratified charge combustion in which the ignition timing is before the compression top dead center.

In this embodiment, therefore, the amount of fuel injected by a first fuel injection with the timing for ending the fuel injection close to the ignition timing, is so set based on the pressure in the cylinder at the time of the first fuel injection that the air-fuel ratio of the formed mixture is close to the stoichiometric air-fuel ratio which enables the mixture to be favorably ignited and burn. Therefore, as the required injection amount Q becomes larger than the amount Qm of fuel injected by the first fuel injection, the amount Qn of fuel in excess of the amount Qm of the injected fuel (Qn=Q−Qm) is injected by a second fuel injection other than the first fuel injection. FIG. 2 illustrates a relationship between the amount Qm (valve-opening period) of fuel injected by the first fuel injection and the amount Qn (valve-opening period) of fuel injected by the second fuel injection for the required injection amount Q. In FIG. 2, A is an ignition timing before the compression top dead center, and TDC is the compression top dead center.

Referring to FIG. 2, if the required injection amount Q is equal to or smaller than an optimum amount Qm1 of fuel injected by the first fuel injection, the fuel may be injected by the first fuel injection only. The mixture that is formed becomes close to the stoichiometric air-fuel ratio and does not become too rich. However, if the required injection amount Q further increases, the fuel injection by the second fuel injection becomes necessary. If the engine load is not so large, the amount Qn of fuel (Qn=Q−Qm) injected by the second fuel injection becomes smaller than the optimum amount Qm1 of fuel injected by the first fuel injection (in the case of Qn1, Qn2 or Qn3). If the pressure in the cylinder is higher than that at the time of the first fuel injection, the fuel is injected to suppress the dispersion of the injected fuel. Otherwise, the mixture formed by the fuel injected by the second fuel injection cannot be brought close to the stoichiometric air-fuel ratio.

In this embodiment, if the amount Qn of fuel injected by the second fuel injection is smaller than the optimum amount Qm1 of fuel injected by the first fuel injection, the second fuel injection is brought to the side delayed behind the first fuel injection, i.e., brought to the side of the compression top dead center, so that the pressure in the cylinder at the time of the second fuel injection becomes higher than the pressure in the cylinder at the time of the first fuel injection. Further, the dispersion of the injected fuel must be further suppressed with a decrease in the amount Qn of fuel injected by the second fuel injection. Therefore, the timing for starting the second fuel injection as well as the timing for ending the second fuel injection are further brought to the delay side so that the pressure further increases in the cylinder at the time of the injection.

Thus, the fuel is injected by the first fuel injection and by the second fuel injection in the same direction. The mixture near the stoichiometric air-fuel ratio formed by the fuel injected by the first fuel injection at the ignition timing A is favorably ignited and burns. The mixture formed by the fuel injected by the subsequent second fuel injection, too, has an air-fuel ratio close to the stoichiometric air-fuel ratio. This mixture catches the mixture that is burning, and is favorably ignited and burns. Therefore, a favorable stratified charge combustion is realized burning nearly all of the required amount of fuel.

If the required fuel amount Q further increases, the amount Qn3 of fuel injected by the second fuel injection is maintained the same but the amount Qm2 of fuel injected by the first fuel injection is slightly increased beyond the optimum amount Qm1. At this moment, the mixture formed by the fuel injected by the first fuel injection becomes slightly richer than the stoichiometric air-fuel ratio but is still sufficiently capable of being ignited to burn. Therefore, a favorable stratified charge combustion can be realized in the same manner as described above. As the required fuel amount Q further increases, the amount of fuel injected by the second fuel injection becomes larger than the optimum amount Qm1 of fuel injected by the first fuel injection (in the case of Qm4, Qm5, Qm6 or Qm7). If the pressure in the cylinder is lower than that at the time of the first fuel injection, therefore, the fuel is injected to accelerate the dispersion of the injected fuel. Otherwise, the mixture formed by the fuel injected by the second fuel injection cannot be brought close to the stoichiometric air-fuel ratio.

In this embodiment, therefore, if the amount Qn of fuel injected by the second fuel injection is larger than the optimum amount Qm1 of fuel injected by the first fuel injection, the second fuel injection is brought to the side in advance of the first fuel injection, i.e. brought to the side of the intake bottom dead center, so that the pressure in the cylinder at the time of the secondary fuel injection becomes lower than the pressure in the cylinder at the time of the first fuel injection. Further, dispersion of the injected fuel must be accelerated with an increase in the amount Qn of fuel injected by the second fuel injection. Therefore, the timing for starting the second fuel injection as well as the timing for ending the second fuel injection are further brought to the advancing side so that the pressure further decreases in the cylinder at the time of injection.

Thus, the fuel injected by the first fuel injection and the fuel injected by the second fuel injection are in the same direction. The mixture near the stoichiometric air-fuel ratio formed by the fuel injected by the first fuel injection at the ignition timing A is favorably ignited and burns. The mixture formed by the fuel injected by the preceding second fuel injection, too, has an air-fuel ratio close to the stoichiometric air-fuel ratio. This mixture that is burning catches the above mixture which, therefore, is favorably ignited and burns. Therefore, a favorable stratified charge combustion is realized burning nearly all of the required amount of fuel.

Figure 3:
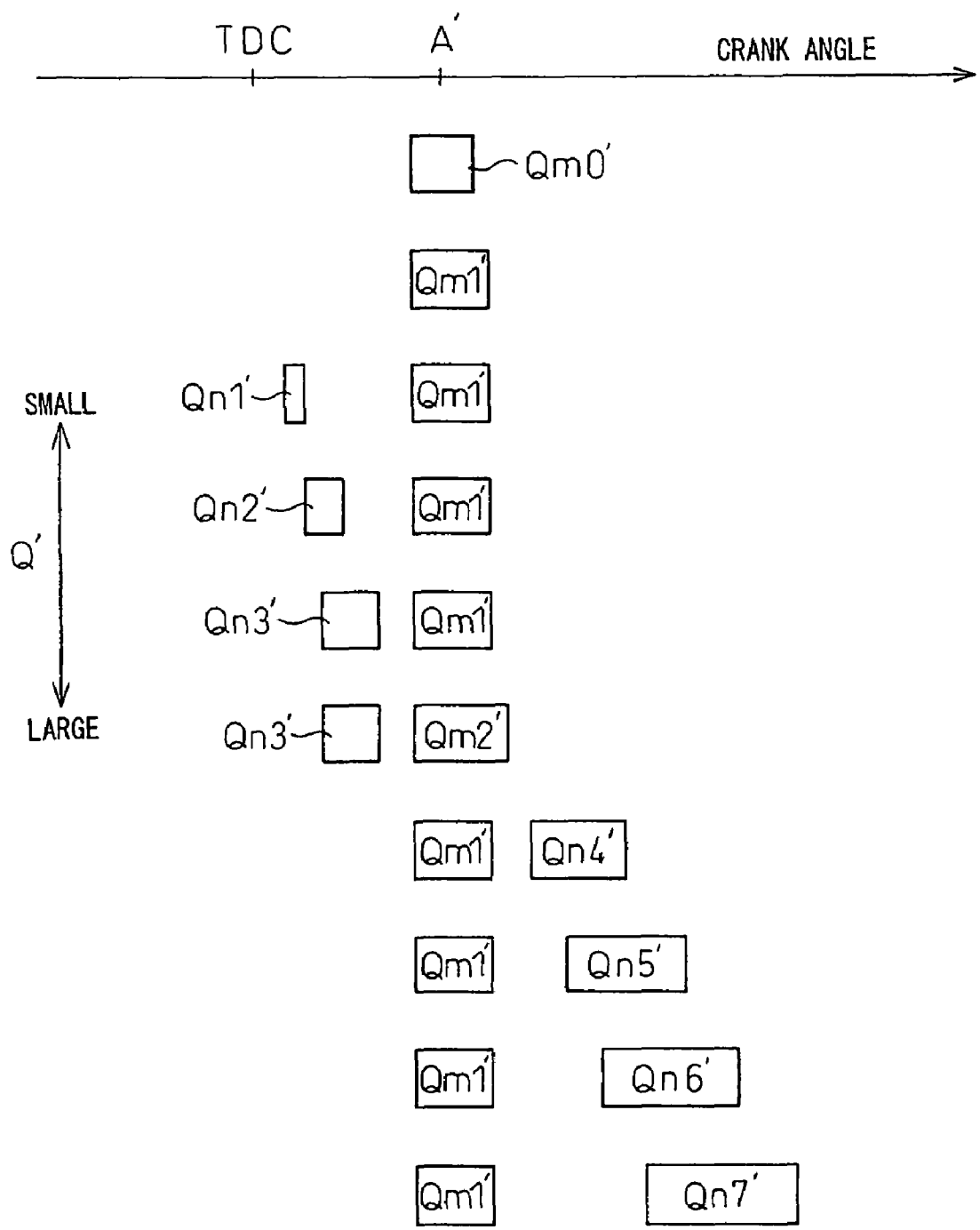
FIG. 3 is a diagram illustrating a relationship in the amount of fuel injection between the first fuel injection and the second fuel injection for the required amount of fuel in the stratified charge combustion in which the ignition timing is after the compression top dead center

Immediately after the start of the engine, it is necessary to quickly warm up a catalyst device arranged in the engine exhaust system to purify the exhaust gas. For this purpose, it is desired to conduct the stratified charge combustion in the expansion stroke by delaying the ignition timing after the compression top dead center so that the exhaust gas of a high temperature that is still burning or after having burned is discharged into the engine exhaust system. In this case, too, if the mixture formed by the first fuel injection near the ignition timing becomes too rich, it becomes difficult to conduct favorable stratified charge combustion. Therefore, the second fuel injection is executed in the expansion stroke by applying the idea of the case of the above stratified charge combustion with the ignition timing taking place before the compression top dead center. FIG. 3 illustrates a relationship between the amount Qm' of fuel injected by the first fuel injection near the ignition timing and the amount Qn' of fuel injected by the second fuel injection for the required injection amount Q'. In FIG. 3, A' is an ignition timing after the compression top dead center, and TDC is the compression top dead center.

Referring to FIG. 3, if the required injection amount Q' is equal to or smaller than an optimum amount Qm1' of fuel injected by the first fuel injection, the fuel may be injected by the first fuel injection only. The mixture that is formed becomes close to the stoichiometric air-fuel ratio and does not become too rich. However, if the required injection amount Q' further increases, the fuel injection by the second fuel injection becomes necessary. If the engine load is not so large, the amount Qn' of fuel (Qn'=Q'−Qm1') injected by the second fuel injection becomes smaller than the optimum amount Qm1' of fuel injected by the first fuel injection (in the case of Qn1', Qn2' or Qn3'). If the pressure in the cylinder is higher than that at the time of the first fuel injection, the fuel is injected to suppress the dispersion of the injected fuel. Otherwise, the mixture formed by the fuel injected by the second fuel injection cannot be brought close to the stoichiometric air-fuel ratio.

In this embodiment, if the amount Qn' of fuel injected by the second fuel injection is smaller than the optimum amount Qm1' of fuel injected by the first fuel injection, the second fuel injection is brought to the side in advance of the first fuel injection, i.e., brought to the side of the compression top dead center, so that the pressure in the cylinder at the time of the second fuel injection becomes higher than the pressure in the cylinder at the time of the first fuel injection. Further, the dispersion of the injected fuel must be further suppressed with a decrease in the amount Qn' of fuel injected by the second fuel injection. Therefore, the timing for starting the second fuel injection as well as the timing for ending the second fuel injection are further brought to the advancing side so that the pressure further increases in the cylinder at the time of the injection.

Thus, the mixture near the stoichiometric air-fuel ratio formed by the fuel injected by the first fuel injection at the ignition timing A' is favorably ignited and burns. The mixture formed by the fuel injected by the preceding second fuel injection, too, has an air-fuel ratio close to the stoichiometric air-fuel ratio. This mixture is caught by the mixture that is burning, and is favorably ignited and burns. Therefore, a favorable stratified charge combustion is realized burning nearly all of the required amount of fuel.

If the required fuel amount Q' further increases, the amount Qn3' of fuel injected by the second fuel injection is maintained the same but the amount Qm2' of fuel injected by the first fuel injection is slightly increased beyond the optimum amount Qm1'. At this moment, the mixture formed by the fuel injected by the first fuel injection becomes slightly richer than the stoichiometric air-fuel ratio but is still sufficiently capable of being ignited to burn. Therefore, a favorable stratified charge combustion can be realized in the same manner as described above. As the required fuel amount Q' further increases, the amount of fuel injected by the second fuel injection becomes larger than the optimum amount Qm1' of fuel injected by the first fuel injection (in the case of Qm4', Qm5', Qm6' or Qm7'). If the pressure in the cylinder is lower than that at the time of the first fuel injection, therefore, the fuel is injected to accelerate the dispersion of the injected fuel. Otherwise, the mixture formed by the fuel injected by the second fuel injection cannot be brought close to the stoichiometric air-fuel ratio.

In this embodiment, therefore, if the amount Qn' of fuel injected by the second fuel injection is larger than the optimum amount Qm1' of fuel injected by the first fuel injection, the second fuel injection is brought to the side delayed behind the first fuel injection, i.e. brought to the side of the expansion bottom dead center, so that the pressure in the cylinder at the time of the second fuel injection becomes lower than the pressure in the cylinder at the time of the first fuel injection. Further, dispersion of the injected fuel must be accelerated with an increase in the amount Qn' of fuel injected by the second fuel injection. Therefore, the timing for starting the second fuel injection as well as the timing for ending the second fuel injection are further brought to the delay side so that the pressure further decreases in the cylinder at the time of the injection.

Thus, the mixture near the stoichiometric air-fuel ratio formed by the fuel injected by the first fuel injection at the ignition timing A' is favorably ignited and burns. The mixture formed by the fuel injected by the subsequent second fuel injection, too, has an air-fuel ratio close to the stoichiometric air-fuel ratio. This mixture catches the above mixture that is burning, and is favorably ignited and burns. Therefore, a favorable stratified charge combustion is realized burning nearly all of the required amount of fuel.

In the stratified charge combustion with the ignition timing taking place either before the compression top dead center or after the compression top dead center, part of the fuel injected by the first fuel injection and by the second fuel injection passes through the spark gap of the spark plug 2. Therefore, the fuel injected by the first fuel injection near the ignition timing and having a too large penetration force may blow out the spark generating across the spark gap to deteriorate the ignition performance. It is therefore desired that the penetration force of the fuel injected by the first fuel injection is smaller than the penetration force of the fuel injected by the second fuel injection. To realize this, for example, the fuel injection pressure at the time of the first fuel injection is set to be lower than the fuel injection pressure at the time of the second fuel injection, or the fuel injection valve at the time of the first fuel injection lifts the valve body in an amount smaller than the amount of lifting the valve body at the time of the second fuel injection in order to lower the flow rate of fuel that flows into the injection port.

In the embodiment, the fuel injection valve 1 was designed to inject fuel in a hollow conical shape which, however, is not to limit the invention. The shape of the fuel spray can be arbitrarily set such as in a solid conical shape, solid pole-like shape or a fan shape of a relatively small thickness injected from a linear slit injection port. Or, an arcuate slit injection port or a plurality of linear slit injection ports may be combined to produce a fuel spray of an arcuate shape having a relatively small thickness in cross section or of a polygonal line in cross section. In any way, at least part of the fuel spray should pass through the spark gap of the spark plug, and the fuel may be injected in a plurality of directions.

In the above-mentioned two stratified charge combustions, if the difference is not so great between the amount of the first fuel injection and the amount of the second fuel injection (e.g., if the amount of the second fuel injection is Qn3 or Qn4), the timing of the first fuel injection and the timing of the second fuel injection are so close to each other that the mixture formed by the second fuel injection does not become so lean or so rich as will not be ignited to burn even if the timing of the second fuel injection is brought to be in advance of, or delayed behind, the first fuel injection. In this case, therefore, the timing of the second fuel injection may be set on either side.

That is, in the embodiment shown in FIG. 2, whether the second fuel injection be brought to the side in advance of, or delayed behind, the first fuel injection is determined depending upon whether the amount Qn of fuel injected by the second fuel injection is larger than, or smaller than, the optimum amount Qm1 of fuel injected by the first fuel injection. Here, however, the second fuel injection may be brought to the side in advance of the first fuel injection if the amount Qn of fuel by the second fuel injection is larger than a first preset amount near the optimum amount Qm1 of fuel injected by the first fuel injection, and the second fuel injection may be brought to the side delayed behind the first fuel injection if the amount Qn of fuel by the second fuel injection is smaller than the first preset amount.

In the embodiment shown in FIG. 3, similarly, the second fuel injection may be brought to the side delayed behind the first fuel injection if the amount Qn' of fuel by the second fuel injection is larger than a second preset amount near the optimum amount Qm1' of fuel injected by the first fuel injection, and the second fuel injection may be brought to the side in advance of the first fuel injection if the amount Qn' of fuel by the second fuel injection is smaller than the preset amount.

The invention claimed is:

1. A direct fuel injection-type spark ignition internal combustion engine which executes a stratified charge combustion by vaporizing the fuel while flying after having been injected into the cylinder in the compression stroke to form a mixture in a portion in the cylinder, and by igniting and burning said mixture by positioning the spark gap of a spark plug in said mixture at the ignition timing before the compression top dead center, wherein when the fuel is required in an increased amount and the air-fuel ratio of said mixture formed by the fuel injected by the first fuel injection near the ignition timing becomes too rich, part of the required amount of fuel is injected by a second fuel injection in the compression stroke separately from said first fuel injection and when the amount of fuel injected by said second fuel injection becomes larger than a preset amount, said second fuel injection is brought to the side in advance of said first fuel injection and when the amount of fuel injected by said second fuel injection becomes smaller than said preset amount, said second fuel injection is brought to the side delayed behind said first fuel injection.

2. The direct fuel injection-type spark ignition internal combustion engine according to claim 1, wherein when said second fuel injection is brought to the side in advance of said first fuel injection, said second fuel injection is brought to the further advanced side with an increase in the amount of fuel injected by said second fuel injection.

3. The direct fuel injection-type spark ignition internal combustion engine according to claim 1, wherein when said second fuel injection is brought to the side delayed behind said first fuel injection, said second fuel injection is brought to the further delayed side with a decrease in the amount of fuel injected by said second fuel injection.

4. The direct fuel injection-type spark ignition internal combustion engine according to claim 1, wherein at least part of the fuel injected by said first fuel injection and said second fuel injection passes through the spark gap of said spark plug, and the penetration force of the fuel injected by said first fuel injection is set to be weaker than the penetration force of the fuel injected by said second fuel injection.

5. A direct fuel injection-type spark ignition internal combustion engine which executes a stratified charge combustion by vaporizing the fuel while it is flying after having been injected into the cylinder in the expansion stroke to form a mixture in a portion in the cylinder, and by igniting and burning said mixture by positioning the spark gap of a spark plug in said mixture at the ignition timing after the compression top dead center, wherein when the fuel is required in an increased amount and the air-fuel ratio of said mixture formed by the fuel injected by said first fuel injection near the ignition timing becomes too rich, part of the required amount of fuel is injected by a second fuel injection in the expansion stroke separately from said first fuel injection and when the amount of fuel injected by said second fuel injection becomes larger than a preset amount, said second fuel injection is brought to the side delayed behind said first fuel injection and when the amount of fuel injected by said second fuel injection becomes smaller than said preset amount, said second fuel injection is brought to the side in advance of said first fuel injection.

* * * * *